United States Patent [19]

Hervé

[11] Patent Number: 4,498,765
[45] Date of Patent: Feb. 12, 1985

[54] PROCESSES FOR THE REMOTE MEASUREMENT OF THE EMISSIVITY AND/OR THE TRUE TEMPERATURE OF A BODY WITH RELATIVELY SMOOTH SURFACE

[75] Inventor: Philippe Hervé, Paris, France

[73] Assignee: Universite Paris X - Paris, Nanterre, France

[21] Appl. No.: 391,380

[22] Filed: Jun. 23, 1982

[30] Foreign Application Priority Data

Jun. 25, 1981 [FR] France .................. 81 12539

[51] Int. Cl.$^3$ .............. G01J 5/58; G01J 5/32
[52] U.S. Cl. ........................... 356/43; 374/126
[58] Field of Search ............... 356/43; 374/121, 123, 374/126

[56] References Cited

U.S. PATENT DOCUMENTS

| | | | |
|---|---|---|---|
| 3,422,678 | 1/1969 | Murray | 374/126 |
| 3,462,224 | 8/1969 | Woods et al. | 356/43 |
| 4,020,695 | 5/1977 | Roney | 376/126 X |

OTHER PUBLICATIONS

Foley, The Review of Scientific Instruments, High Speed Optical Pyrometer, vol. 41, No. 6, pp. 827-834, Jan. 15, 1970.

Primary Examiner—Vincent P. McGraw
Assistant Examiner—Samuel A. Turner
Attorney, Agent, or Firm—Larson and Taylor

[57] ABSTRACT

A process for the remote measurement of the emissivity $\epsilon$ of a body (1) with relatively smooth surface, consisting: in making, with a detector (6) and a converter (9), a first measurement A of the luminance at a point M on the surface at an emission angle $\theta$, the thermal radiation (2) on which the measurement is made being polarized (at 4) in a first direction with respect to the emission plane, in making a second measurement B of the luminance at the same point and at the same emission angle $\theta$, the thermal radiation being polarized in a second direction, different from the first one, finally, in determining the emissivity $$\epsilon = a_1 + \left(1.05 - \frac{B}{A}\right) \times (9.3332 \times 10^{-8}\theta^5 - 2.6666 \times 10^{-5}\theta^4 + 2.9883 \times 10^{-3}\theta^3 - 0.16243\theta^2 + 4.18573\theta - 38.49)$$

in which
$$\begin{cases} 0.82 < a_1 < 1.12 \\ 0 \leq \theta_1 \leq 15° \\ 75° < \theta_2 < 105° \end{cases}$$

$\theta_1$ being the angle of the axis of the polarizer for A and $\theta_2$ being the angle of the axis of the polarizer for B, measured with respect to a polarization perpendicular to the emission plane.

7 Claims, 1 Drawing Figure

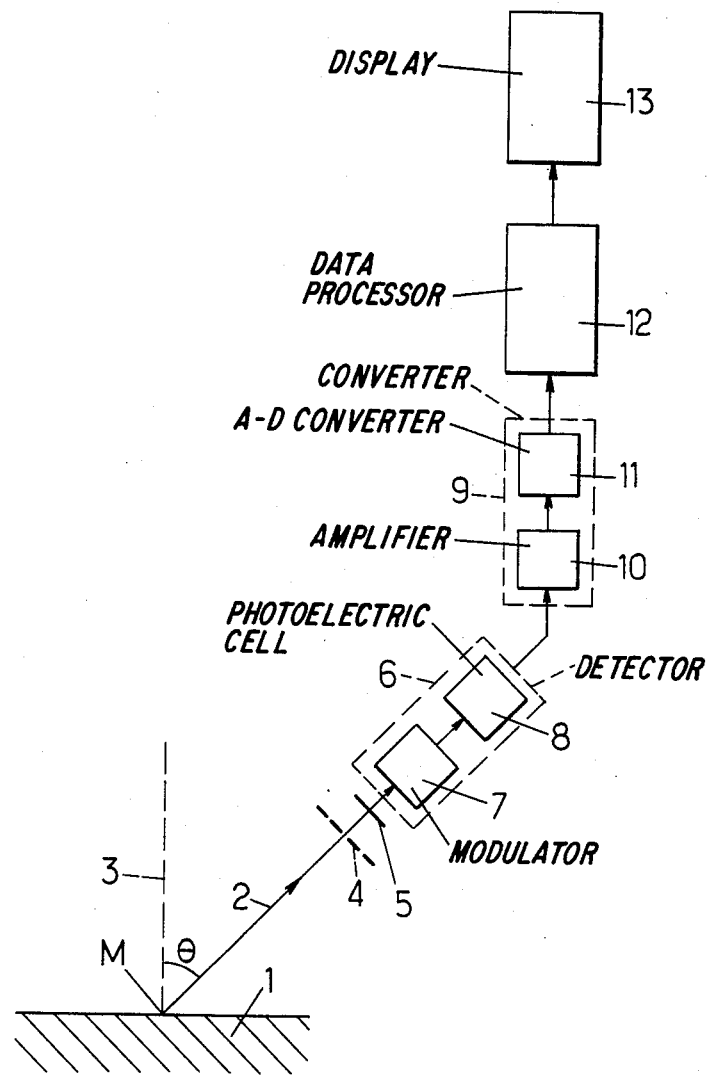

PROCESSES FOR THE REMOTE MEASUREMENT OF THE EMISSIVITY AND/OR THE TRUE TEMPERATURE OF A BODY WITH RELATIVELY SMOOTH SURFACE

The present invention relates to improvements to processes for the remote measurement of the emissivity and/or the true temperature of a body having a relatively smooth surface, by successive measurements of the luminance at the same point on the surface of the body, made respectively on thermal radiations polarized in different directions.

Such a remote measuring process is already known, in which the normal luminance C is first of all measured at a single point on the surface of the body, then two polarized measurements A and B are successively made at an emission angle of $\theta$, still at the same point on the surface of the body. The normal emissivity, or normal emission factor, $\epsilon$, may then be readily calculated from the following formula, derived from Fresnel formulae:

$$\epsilon_{\lambda,normal} = \frac{C}{A}\left(2 - \frac{B}{A}\right)$$

The true temperature T of the body at the point of measurement may also be calculated from the formula:

$$C = \frac{\epsilon k_1}{\lambda^5 (e^{k_2/\lambda T} - 1)} \simeq \epsilon k_1 \lambda^{-5} e^{-k_2/\lambda T}$$

in which
  $K_1$ and $k_2$ are known constants
  $\epsilon$ is the previously determined emissivity
  $\lambda$ is the wavelength of the radiation
  C is the previously measured normal luminance
  T is the true temperature This known process gives every satisfaction for with it results may be obtained substantially more accurate than by means of the other known processes.

However, the use of this known process required three successive emissivity measurements, one C at a zero angle ($\theta=0$) and two others A and B at identical non zero angles and imperatively equal to 45°, respectively with different polarizations of the beam. Furthermore, because the measurement C and the measurements A and B must be made at the same point on the surface of the body and respectively at fixed angles with respect to this surface, the measurement apparatus must be placed at a fixed distance from the surface of the body. The accuracy of the final result rests, in part at least, on keeping this fixed distance between the apparatus and the surface of the body.

Though these measuring conditions and requirements can be readily provided in the laboratory, the same cannot be said under practical industrial measurement conditions, for example for determining the true temperature of a rolled steel strip travelling at high speed.

The invention has then essentially as aim to perfect this known process so that it provides, under industrial measurement conditions, the same advantages and particularly the same accuracy as the process already known; in other words, the invention has essentially as aim to make the abovementioned known process both simpler and more rapid in use so that it gives every satisfaction for the different requirements of practice, in particular in the industrial field.

To these ends, the process for remote measurement of the emissivity of a body with relatively smooth surface is characterized, in accordance with the invention, in that it comprises the succession of steps consisting:

in making a first measurement A of the luminance at said point on the surface of the body at an emission angle $\theta$, the thermal radiation on which the measurement is made being polarized in a first direction with respect to the emission plane, then making a second measurement B of the luminance at the same point and at the same emission angle $\theta$, the thermal radiation on which the measurement is made being polarized in a second direction with respect to the emission plane, this second direction being different from said first direction, finally, in determining the emissivity $\epsilon$ of the body from the following function:

$$\epsilon = a_1 + \left(1.05 - \frac{B}{A}\right) \times (9.3332 \times 10^{-8}\theta^5 - 2.6666 \times 10^{-5}\theta^4 + 2.9883 \times 10^{-3}\theta^3 - 0.16243\theta^2 + 4.18573\theta - 38.49)$$

in which $\begin{cases} 0.82 < a_1 < 1.12 \\ 0 \leq \theta_1 \leq 15° \\ 75° < \theta_2 < 105° \end{cases}$ $\theta_1$ being the angle of the axis of the polarizer for measurement A with respect a polarization perpendicular to the emission plane, and $\theta_2$ being the angle of the axis of the polarizer for measurement B with respect to a polarization perpendicular to the emission plane.

In the process of the invention, it is no longer necessary to make the measurement of normal luminance C at the considered point on the surface of the body, and only measurements A and B are to be made at the same emission angle $\theta$. The result is that the distance between the measuring apparatus and the point on the surface of the body where the measurements are made is no longer critical and the value of the emissivity determined in accordance with the invention remains independent of this distance. Such a process may then be used in a simpler way under industrial conditions, which would not be the case with the known process because of the practical impossibility of maintaining said distance constant.

Moreover, this simplification of the process leads to a corresponding simplification of the measuring apparatus, since said apparatus need no longer comprise the different mirrors and optical elements required, in use of the prior process, to cause radiations emitted at angles of 45° and 0° to strike the polarizer and pyrometer.

Preferably, the coefficient $a_1$ is chosen equal to 1.02.

Advantageously, recourse may be had to a simplified form of use of the process by determining the emissivity $\epsilon$ from the formula $$\epsilon = 1.02 + \left(1.05 - \frac{B}{A}\right)(1.6267 \times 10^{-3}\theta^2 - 0.22463\,\theta + 7.934) \text{ for } 40° \, \theta \, 75°$$

with an error less than 3%.

In practice, the measuring apparatus may preferably be designed, and more especially adjusted and calibrated, so that the measurements are made at an emission angle of 45° and so as to then determine the emissivity from the following reduced formula:

$$\epsilon = 2.21 - 1.13 \frac{B}{A}$$

According to another aspect of the invention, it is possible to measure at a distance the true temperature of the body:
- by determining the emissivity $\epsilon$ of the body as mentioned above,
- by determining the normal luminance C at the point on the surface of the body where measurements A and B are made from the following formula $$\frac{A+B}{2C} = (2.9418 \times 10^{-12}\theta^6 - 7.6505 \times 10^{-10}\theta^5 + 7.046 \times 10^{-8}\theta^4 - 4.080 \times 10^{-6}\theta^3 + 1.8053 \times 10^{-4}\theta^2 - 1.9213 \times 10^{-3}\theta + 0.012133)\frac{B}{A} - 3.8119 \times 10^{-11}\theta^6 + 1.2025 \times 10^{-8}\theta^5 - 1.6018 \times 10^{-6}\theta^4 + 1.13695 \times 10^{-4}\theta^3 - 4.6068 \times 10^{-3}\theta^2 + 0.09692\, \theta + a_2$$

with $0.132 < a_2 < 0.152$
and finally by determining the true temperature of the body from the following formula $$C = \frac{\epsilon k_1}{\lambda^5 (e^{k_2/\lambda T} - 1)}$$

or from the following approximate formula $$C \simeq \epsilon k_1 \lambda^{-5} e^{-k_2/\lambda T}$$

Preferably, the coefficient $a_2$ is chosen equal to 0.1420.

Advantageously, in practice, the measurements may be made at an emission angle close to 45° and the following reduced formula may be used:

$$\frac{A+B}{2C} = 0.092 \frac{B}{A} + 0.87$$

With the invention, it is possible to measure at a distance a characteristic value of a body (either its emissivity or its true temperature) in a way simple and easy to put into practice under industrial conditions, while keeping a measurement accuracy much superior to that obtained with conventional measuring processes.

The invention will be better understood from reading the following description, in which reference is made to the accompanying drawing in which the FIGURE illustrates schematically one embodiment of the apparatus for implementing the process of the invention.

According to the aim of the invention, it is proposed to determine the characteristics (emissivity, true temperature) of a body 1 from the analysis of the radiation 2 emitted by said body at an angle of inclination $\theta$ of radiation 2 with respect to the normal 3 to the surface of body 1, at measuring point M.

The surface of body 1 subjected to the measurement is assumed to be relatively smooth.

The radiation 2 passes first of all through a dichroic polarizer 4 capable of rotating for example through a quarter of a revolution between two measurements A and B corresponding then to different polarizations of the radiation.

An interferential filter 5, placed behind the polarizer 4, only lets pass the required wavelengths.

The polarized and filtered radiation then reaches a detector device 6, which may be formed for example by a lead sulfide photoelectric cell 8, whose temperature is stabilized, delivering a signal which is processed by a modulator 7.

A converter device 9 then follows which comprises a selective amplifier 10, then an analog-digital converter 11.

The signals thus obtained are then applied to the input of a data processing device 12, which may be a microprocessor (e.g. of the 6502 type) or a micro-computer (e.g. APPLE II), which processes the signals corresponding to measurements A and B so as to determine the value of the emissivity $\epsilon$ and/or the value of the true temperature T at point M of body 1.

The signals corresponding to the result(s) obtained are finally applied to a display device 13 where they are presented in an appropriate form.

To make the measurement, the procedure of the invention is the following.

A first measurement A of the luminance is made at point M on the surface of body 1, at the emission angle $\theta$ and for a first polarization direction forming an angle $\theta_1$ with respect to a polarization perpendicular to the emission plane.

Then the polarizer is rotated through an angle $\theta_2$ with respect to the perpendicular polarization and a second measurement B of the luminance is made at the same point M on the surface of body 1, at the same emission angle.

Then the value of the emissivity $\epsilon$ is calculated from the formula:

$$\epsilon = a_1 + \left(1.05 - \frac{B}{A}\right) \times (9.3332 \times 10^{-8}\theta^5 - 2.6666 \times 10^{-5}\theta^4 + 2.9883 \times 10^{-3}\theta^3 - 0.16243\, \theta^2 + 4.18573\, \theta - 38.49)$$

in the case where:

$$0 \leq \theta_1 \leq 15°$$

and $$75° < \theta_2 < 105°$$

and $a_1$ is a coefficient between 0.82 and 1.12, preferably equal to 1.02.

In practice, an acceptable error rate, less than 3% is obtained for values of the emission angle $\theta$ between 40° 75°; the emissivity may then be calculated from the simpler formula:

$$\epsilon = 1.02 + \left(1.05 - \frac{B}{A}\right) \times (1.6267 \times 10^{-3}\,\theta^2 - 0.22463\,\theta + 7.934)$$

For industrial applications, the emission angle $\theta$ may be chosen always the same and equal to 45° and angles $\theta_1$ and $\theta_2$ chosen respectively equal to 0° and 90° with the formula:

$$\epsilon = 2.21 - 1.13 \frac{B}{A}$$

corresponding to a rotation of a quarter of a revolution of the polarizer, in other words to orthogonal polarization direction for measurements A and B.

Of course, if the practical value $\theta = 45°$ is the one which seems to correspond to the most favorable measurement conditions, it is quite possible to choose, for the emission angle, another value between the above mentioned limits and to determine a corresponding simplified formula.

The data processing device 12, in the embodiment of the apparatus shown in the figure, is arranged (programmed) to carry out automatically the calculation of $\epsilon$ from one or the other of the above formulae, depending on the accuracy desired concerning the emissivity.

Once the value of the emissivity $\epsilon$ is known, it is possible to determine the normal luminance C at point M from the formula:

$$\frac{A+B}{2C} = (2.9418 \times 10^{-12}\theta^6 - 7.6505 \times 10^{-10}\theta^5 + 7.046 \times 10^{-8}\theta^4 - 4.080 \times 10^{-6}\theta^3 + 1.8053 \times 10^{-4}\theta^2 - 1.9213 \times 10^{-3}\theta + 0.012133)\frac{B}{A} - 3.8119 \times 10^{-11}\theta^6 + 1.2025 \times 10^{-8}\theta^5 - 1.6018 \times 10^{-6}\theta^4 + 1.13695 \times 10^{-4}\theta^3 - 4.6068 \times 10^{-3}\theta^2 + 0.09692\,\theta + a_2$$

the coefficient $a_2$ being between 0.132 and 0.152 and preferably equal to 0.142.

By taking the previously envisaged practical case where the emission angle is of the order of 45°, C may be calculated from the simplified formula:

$$\frac{A+B}{2C} = 0.092 \frac{B}{A} + 0.87$$

Knowing the values $\epsilon$ and C, the true temperature of body one at point M may be calculated from the conventional formula:

$$C = \frac{\epsilon k_1}{\lambda^5 (e^{k_2/\lambda T} - 1)}$$

in which $k_1$ and $k_2$ are known constants or from the approximate formula:

$$C \approx \epsilon \cdot k_1 \cdot \lambda^{-5} \cdot e^{-k_2/\lambda T}$$

Of course, here again, the calculation of the true temperature T of body 1 at point M may be made automatically by the data processing device 12 which has been suitably arranged (programmed).

The process of the invention finds for example, but not exclusively, a particularly interesting application in the field of the metallurgical industry for controlling continuously, in a cold rolling mill, the temperature (relatively low, of the order of 100° C.) of a rolled steel strip (material of low emissivity, of the order of 0.1 to 0.3) travelling at high speed.

As is evident and as it follows moreover already from what has gone before, the invention is in no wise limited to thoe of its modes of application and embodiments which have been more especially considered; it embraces, on the contrary, all variations thereof.

I claim:

1. A process for the remote measurement of the emissivity of a body with relatively smooth surface, by successive measurements of the luminance at the same point on the surface of the body, made respectively on thermal radiations polarized in different directions, characterized in that it comprises the succession of steps consisting:

in making a first measurement A of the luminance at said point on the surface of the body at an emission angle $\theta$, the thermal radiation on which the measurement is made being polarized in a first direction with respect to the emission plane, then in making a second measurement B of the luminance at the same point and at the same emission angle $\theta$, the thermal radiation on which the measurement is made being polarized in a second direction with respect to the emission plane, this second direction being different from said first direction, finally, in determining the emissivity $\epsilon$ of the body from the following functions:

$$\epsilon = a_1 + \left(1.05 - \frac{B}{A}\right) \times (9.3332 \times 10^{-8}\theta^5 - 2.6666 \times 10^{-5}\theta^4 + 2.9883 \times 10^{-3}\theta^3 - 0.16243\theta^2 + 4.18573\theta - 38.49)$$

in which $\begin{cases} 0.82 < a_1 < 1.12 \\ 0 \leq \theta_1 \leq 15° \\ 75° < \theta_2 < 105° \end{cases}$ $\theta_1$ being the angle of the axis of the polarizer for measurement A with respect to a polarization perpendicular to the emission plane, and $\theta_2$ being the axis of the polarizer for measurement B with respect to a polarization perpendicular to the emission plane.

2. The process according to claim 1, characterized in that the coefficient $a_1$ is chosen equal to 1.02.

3. The process according to claim 2, characterized in that, for values of the emission angle $\theta$ between 40° and 74°, the emissivity is determined from the approximate formula:

$$\epsilon = 1.02 + \left(1.05 - \frac{B}{A}\right) \times (1.6267 \times 10^{-3}\,\theta^2 - 0.22463\,\theta + 7.934)$$

with an error less than 3%.

4. The process according to claim 3, characterized in that, for $\theta = 45°$, the emissivity is determined from the following approximate formula:

$$\epsilon = 2.21 - 1.13 \frac{B}{A}$$

5. A process for the remote measurement of the true temperature of a body with relatively smooth surface, characterized in that it comprises the succession of steps consisting:

in determining the emissivity $\epsilon$ of the body according to any one of claims 1 to 4, in determining the normal luminance C at the point on the surface of the body where measurements A and B have been made from the following formula:

$$\frac{A+B}{2C} = (2.9418 \times 10^{-12}\theta^6 - 7.6505 \times 10^{-10}\theta^5 + 7.046 \times 10^{-8}\theta^4 - 4.080 \times 10^{-6}\theta^3 + 1.8053 \times 10^{-4}\theta^2 - 1.9213 \times 10^{-3}\theta + 0.012133)\frac{B}{A} - 3.8119 \times 10^{-11}\theta^6 + 1.2025 \times 10^{-8}\theta^5 - 1.6018 \times 10^{-6}\theta^4 + 1.13695 \times 10^{-4}\theta^3 - 4.6068 \times 10^{-3}\theta^2 + 0.09692\,\theta + a_2$$

with $0.132 < a_2 < 0.152$ and finally, in determining the true temperature of the body from the following formula:

$$C = \frac{\epsilon k_1}{\lambda^5 (e^{k_2/\lambda T} - 1)}$$

or from the following approximate formula:

$$C \simeq \epsilon k_1 \lambda^{-5} e^{-k_2/\lambda T}.$$

6. The process according to claim 5, characterized in that the coefficient $a_2$ is chosen equal to 0.1420.

7. The process according to claim 6, characterized in that the normal luminance C is determined from the following approximate formula:

$$\frac{A+B}{2C} = 0.092\,\frac{B}{A} + 0.87$$

for $\theta$ close to 45°.

* * * * *

UNITED STATES PATENT AND TRADEMARK OFFICE
CERTIFICATE OF CORRECTION

PATENT NO. : 4,498765

DATED : February 12, 1985

INVENTOR(S) : HERVE, Philippe

It is certified that error appears in the above-identified patent and that said Letters Patent is hereby corrected as shown below:

Column 4, line 11, delete "delivering" and insert -- receiving --.

Signed and Sealed this

Twenty-seventh Day of August 1985

[SEAL]

Attest:

DONALD J. QUIGG

Attesting Officer     Acting Commissioner of Patents and Trademarks